Patented Jan. 18, 1927.

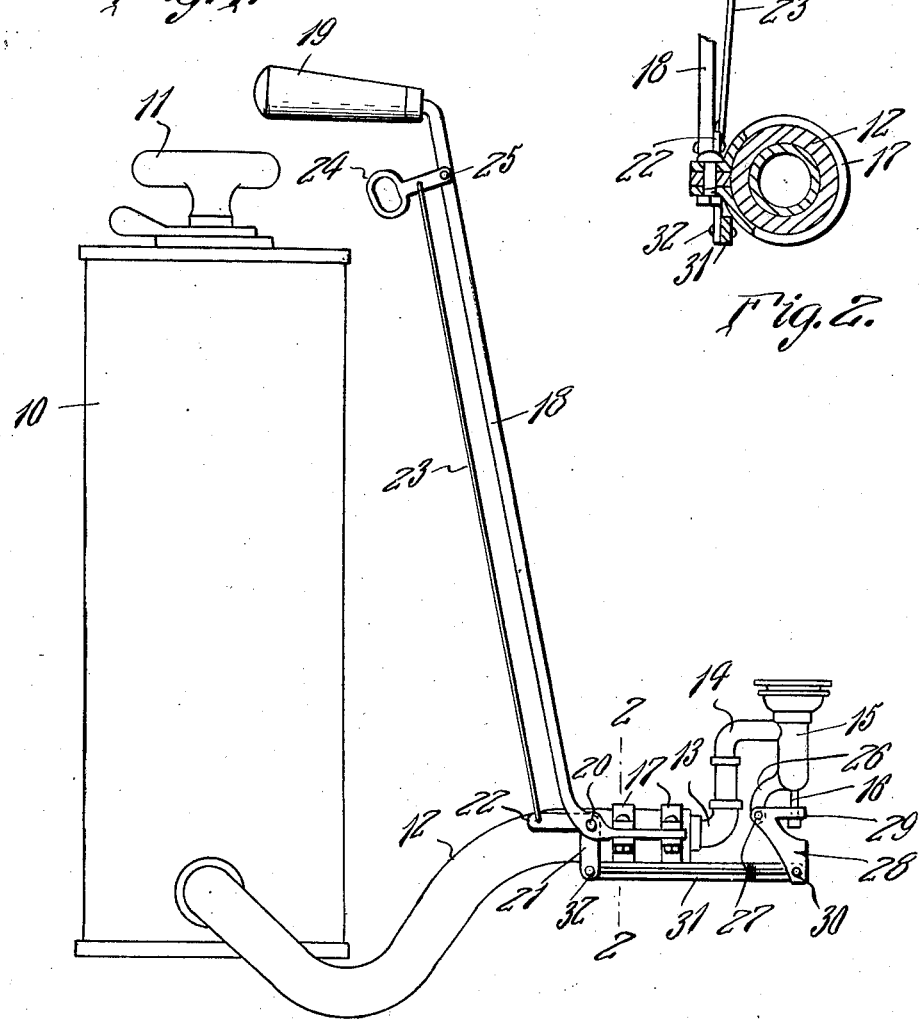

1,614,520

UNITED STATES PATENT OFFICE.

JAMES A. BROWN, OF BRISTOL, TENNESSEE.

SPRAYING DEVICE.

Application filed October 15, 1924. Serial No. 743,807.

This invention relates to devices for spraying plants for the purpose of killing insects thereon or treating them for certain plant diseases, and has for its object the provision of a novel manipulating means for a spray device which enables the spray device to be used very close to the ground so that the under sides of low-hanging foliage or leaves may be effectually treated as is necessary in the destruction of certain types of insects, such for instance as the Mexican beetles which are very destructive to bean plants.

An important object is the provision of a spray device control mechanism which is capable of being used in association with or as an attachment to already existing spray devices of a well-known type on the market, the invention contemplating the provision of a control device which enables use of the spray nozzle at a point very close to the surface of the ground so that the undersides of leaves may be treated.

A further object is the provision of a control mechanism including a rod provided with a handle by means of which the spray nozzle may be tilted in any desired direction, the rod carrying a finger operated trigger device for controlling the flow of spraying liquid through the nozzle.

An additional object is the provision of a device of this character which will be simple and inexpensive in manufacture, easy to install upon or apply to already existing structures, and which will moreover be efficient and durable in service and a general improvement in the art.

With the above and other objects and advantages in view, the invention consists in the details of construction to be hereinafter more fully described and claimed and illustrated in the accompanying drawings in which:

Figure 1 is a side elevation of the complete device showing a spray tank and the associated parts, Figure 2 is a detail section on the line 2—2 of Figure 1, and Figure 3 is a detail view of the connecting link.

Referring more particularly to the drawings, the numeral 10 designates a tank which serves as a reservoir for the spray liquid together with compressed air which is applied thereto by any suitable pumping mechanism, not shown in detail, but which may include a plunger device having an operating handle 11 extending above the top of the receptacle or container. Any suitable filling opening may be provided whereby the spray liquid may be introduced within the receptacle. Leading from the bottom of the receptacle is a flexible outlet tube or pipe 12 within the end of which is secured an outlet member connected by an elbow 13 with a pipe structure 14 formed of any necessary or desired number of parts and carrying a conventional type of spray nozzle 15 having a control valve therein adapted to be actuated by means of a stem 16.

In carrying out the invention, I provide a pair of sectional clamping members 17 embracingly engaged upon the outlet end of the pipe or hose 12 and serving as securing means for an elongated rod 18 which extends upwardly and which terminates in an angularly deflected grip 19. Pivoted at 20 upon the rod 18 is an angle lever 21 with one arm 22 of which is pivotally connected a link or rod 23 which extends upwardly along the handle 18 and which is connected with a trigger 24 pivoted at 25 upon the rod. This trigger is of ring-like formation so that the operator may engage his finger within it for the purpose of applying a pull to the rod 23 for moving the angle lever 21.

The nozzle 15 has a supporting arm 26 thereon near its lower portion upon which is pivoted, at 27, an angle lever 28 having one arm 29 operatively engaging the stem 16. Pivotally connected at 30 with the angle lever 28 is a rearwardly extending link 31 which is pivotally connected at 32 with the remaining arm of the angle lever 21.

In the operation, it is readily apparent that the operator grasps the grip 19 and is thus able to move the spray nozzle to the desired position within or beneath the plant to be treated, it being readily possible by means of this handle to tilt to any desired inclination in order to reach parts which would under ordinary circumstances be inaccessible. By inserting a finger through the ring of the trigger 24 and pulling thereon it is apparent that the angle lever 21 will be rocked upon its pivot and owing to the provision of the connecting link 31 it is apparent that the angle lever 28 will be correspondingly rocked for moving the stem 16 and permitting compressed air and spray liquid to pass out through the nozzle 15 to the desired place.

From the foregoing description and a study of the drawings it will be apparent that I have thus provided a very simply constructed device for the purpose specified by means of which it is easily possible to gain access to the undersides of the leaves of plants growing very close to the ground so that many destructive insects may be destroyed which would be inaccessible in case the ordinary mechanism is used. A point to be considered is that the lever and trigger mechanism may be applied as an attachment to already existing spray devices or it may be built into the same, this detail being immaterial and being well within the scope of the invention.

While I have shown and described the preferred embodiment of the invention, it should be understood that I reserve the right to make such changes in the form, construction and arrangement of parts as will not depart from the spirit of the invention or the scope of the subjoined claim.

Having thus described the invention, I claim:

In combination with a flexible conduit having one end connected with a source of fluid supply and a valve nozzle secured to its other, or free end, a nozzle and valve manipulating means comprising a rod having its ends bent at substantially right angles to the main portion and extending in opposite directions to form respectively a handle portion and a conduit attaching portion, clamping means securing said attaching portion to the free end of the conduit, a bell crank lever pivoted at its angle to the bend between the main and the conduit attaching portion of the rod, the arms of the lever extending downwardly and rearwardly respectively, link and lever mechanism connecting said downwardly projecting arm with the valve of said nozzle, a valve-operating trigger pivoted to said rod subjacent said handle portion, and a link connecting said trigger and said rearwardly projecting bell-crank arm.

In testimony whereof I affix my signature.

JAMES A. BROWN.